United States Patent [19]

White

[11] Patent Number: 4,743,336

[45] Date of Patent: May 10, 1988

[54] DEVICE FOR MOUNTING FLEXIBLE SPACERS ON GLASS SHEETS

[75] Inventor: William White, Oberengstringen, Switzerland

[73] Assignee: Peter Lisec, Amstetten-Hausmening, Austria

[21] Appl. No.: 930,937

[22] Filed: Nov. 17, 1986

[30] Foreign Application Priority Data

Nov. 18, 1985 [CH] Switzerland ........................ 04909/85

[51] Int. Cl.$^4$ ................................................ B32B 31/18

[52] U.S. Cl. .................................... 156/522; 156/107; 156/574; 156/577

[58] Field of Search ................. 156/99, 107, 109, 468, 156/475, 486, 522, 574, 577

[56] References Cited

U.S. PATENT DOCUMENTS

| | | | |
|---|---|---|---|
| 3,829,347 | 8/1974 | Honea | 156/577 |
| 3,886,013 | 5/1975 | Bowser et al. | 156/577 |
| 4,559,001 | 12/1985 | Wiedenhofer et al. | 156/107 |
| 4,561,929 | 12/1985 | Lenhardt | 156/107 |
| 4,574,029 | 3/1986 | Murray | 156/577 |

*Primary Examiner*—Caleb Weston

*Attorney, Agent, or Firm*—Young & Thompson

[57] ABSTRACT

A device for mounting flexible spacers (22) to glass sheets during the course of manufacturing insulating glass comprises a processing tool (4) movable along the periphery of a glass sheet held in the device, the tool mounting the spacer (22) to the glass sheet with the aid of a pivotable sliding pressure pad (21). Devices (34, 35, 36, 37) with angles are provided for shaping the corner zones of the spacer (22) mounted to the glass sheet, and a clamp (51) for joining the ends of the spacer (22) to each other.

8 Claims, 2 Drawing Sheets

DEVICE FOR MOUNTING FLEXIBLE SPACERS ON GLASS SHEETS

The invention relates to a device for mounting flexible and longitudinally elastic spacers for insulating glass on a glass sheet, with a means for holding the glass sheet.

The prior art encompasses, besides spacer frames consisting of metallic profiled strips, also flexible spacer frames. Such a spacer frame has been known, for example, from DOS No. 3,002,904.

EP-Al No. 152,807 discloses an apparatus for attaching flexible spacer frames. This conventional apparatus has the drawback that the glass sheet must be moved relatively to an installation for mounting the spacer frame, which installation is fixedly arranged in the machine; in this procedure, linear movements as well as pivotal movements must be executed. The motions to be performed with the glass sheet in the conventional apparatus involve considerable expenses, especially in case of glass sheets having relatively large dimensions.

The invention is based on the object of providing a device of the type discussed above which is simplified and improved over the state of the art.

This object has been attained, according to this invention, by providing a processing tool exhibiting a sliding pressure pad for causing a spacer to come into contact with and be pressed against the glass sheet, and by making the sliding pressure pad movable along the periphery of the glass sheet and pivotable four times by respectively 90° about an axis perpendicular to the glass sheet.

Flexible spacer frames can be mounted to a stationary sheet with the aid of the device of this invention. In this connection, the advantage is obtained that the complicated mechanism, to be designed for the largest glass sheet to be processed thereby, as required in EP-Al No. 152,807, is no longer necessary.

Additional features and details of the invention can be seen from the dependent claims and the description of the invention set forth below, reference being had to the appended drawings wherein:

Figure 1:
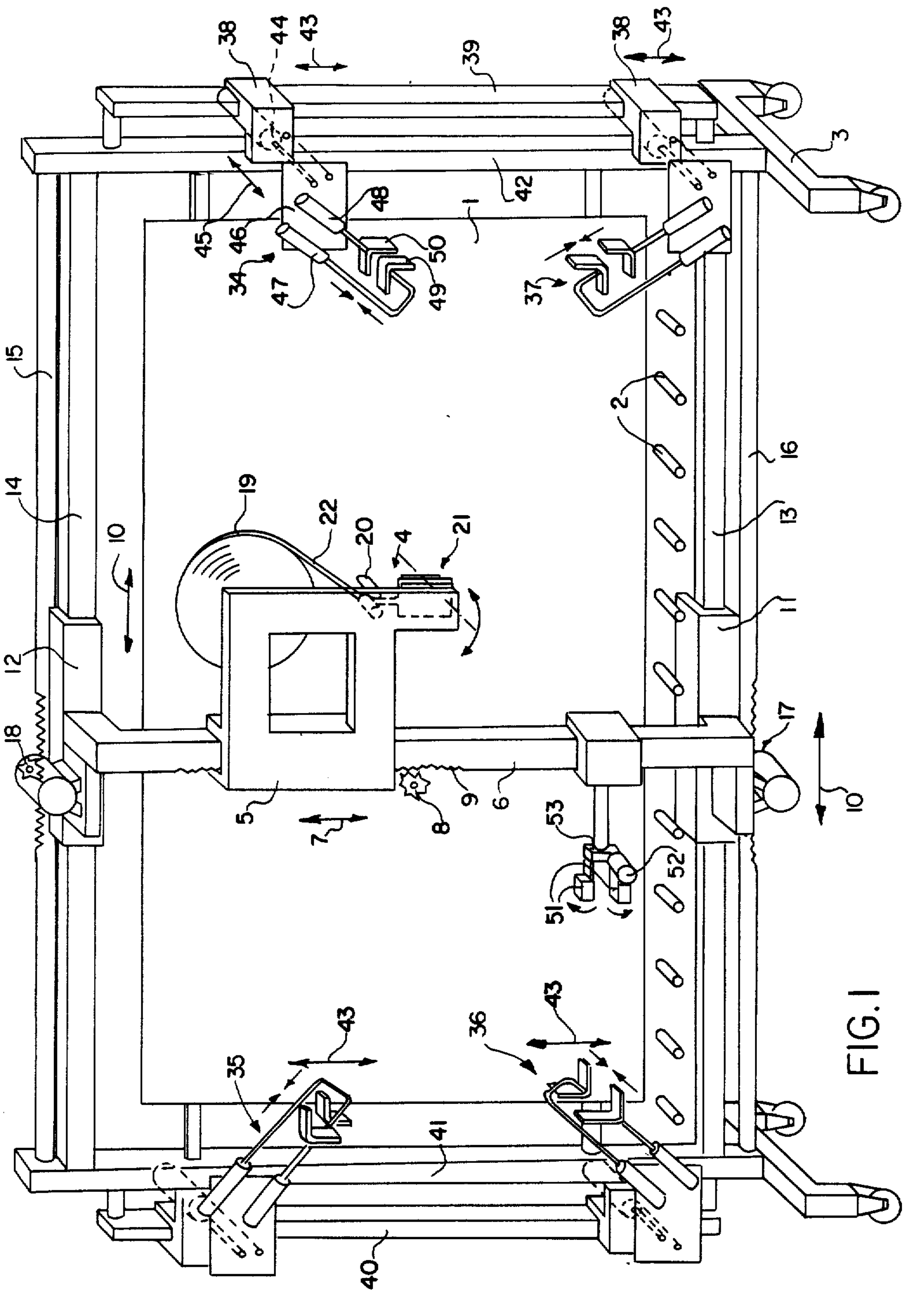
FIG. 1 shows a device according to the invention in a perspective view.
Figure 2:
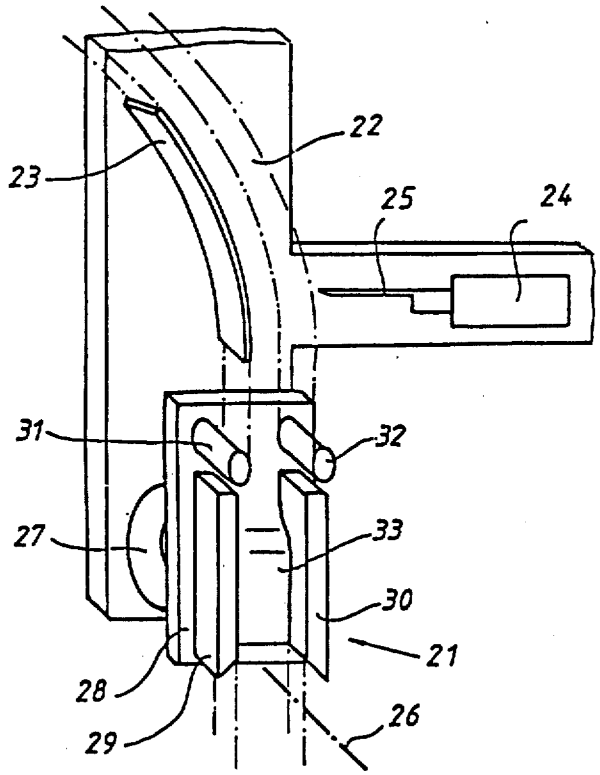
FIG. 2 shows a detail of the processing tool.

The device for attaching flexible and longitudinally elastic spacers for insulating glass on a glass sheet, as illustrated in FIG. 1 of the drawings, comprises a supporting wall 1 rearwardly inclined by a few degrees (for example 5°-8°), a conveying route made up of several conveyor rollers 2 being provided at the lower rim of this wall for the feeding and discharging of glass sheets. The supporting wall 1, held in a machine frame 3, can be designed as an air cushion wall to permit maximally friction-free transportation of the glass sheets.

A processing tool 4 is arranged in front of the supporting wall 1, this tool being reciprocatable (arrow 7) by way of a slide 5 along an essentially vertical beam 6. In order to move the slide 5 with respect to the beam 6, this slide is equipped, for example, with a drive pinion 8 meshing with a rack 9 at the beam 6, this pinion being driven by a drive motor, not shown. The beam 6, in turn, is movable in the conveying direction (arrows 10) by way of slide elements 11 and 12 along horizontal guide rails 13, 14 affixed to the frame, this movement taking place with the aid of pinions 17 and 18 engaging into racks 15 and 16.

The processing tool 4 carries a storage reel 19 from which is taken off a spacer 22 by means of a pair of feeding rollers 20 and passed on to a sliding pressure pad 21. In the path of the spacer 22 between the feeding roller pair 20 and the sliding pressure pad 21 a curved sliding guide 23 is provided; in opposition to the latter, a blade 25 for cutting the spacer 22 is arranged, operable by means of a pressure medium motor or the like. The sliding guide serves as an abutment in this procedure.

The sliding pressure pad 21 can be pivoted four times by 90° about an axis 26 perpendicular to the glass sheet to which the spacer 22 is to be mounted. For executing the pivoting motions, a suitable drive motor 27 is provided. In order to fix the sliding pressure pad 21 in position after a pivoting by 90° in the respective operating positions, a cam disk associated with spring-loaded locking rollers can be connected for rotation with the shaft carrying the sliding pressure pad 21. Pivoting of the sliding pressure pad 21 can also be performed by way of a slotted guide disk associated therewith.

The sliding pressure pad 21 consists of a base plate 28 on which two guide strips 29 and 30 are arranged, the spacer 22 being moved between these strips therethrough. At the end of the guide strips 29 and 30 on the inlet side, two guide rollers 31, 32 are provided taking care of affording entrance for the spacer 22 in between the guide strips 29 and 30 without any problems, even when the sliding pressure pad 21 has been pivoted.

An oblique surface 33 is provided between the guide strips 29 and 30, this surface being inclined toward the glass sheet as seen in the direction of travel of the spacer 22; by means of this surface, the spacer 22 is increasingly brought closer to the glass sheet to which it is to be mounted, and is finally brought in contact therewith.

It is also to be noted that the axis 26 about which the sliding pressure pad 21 is pivotable is located in the zone of the end of the two guide strips 29 and 30 on the outlet side.

The device of this invention furthermore includes four installations 34, 35, 36 and 37 for shaping the corners of the spacer 22. These installations shape the spacer 22, which latter extends in the corner zone approximately in the configuration of a quarter of a circular arc, into a sharp corner. Each of these corner shaping means 34-37 can be displaced up and down (arrows 43) by way of a slide 38 along substantially vertical guide rails 39 and 40 that lie parallel to the supporting wall 1; these guide rails are mounted to vertical supports 41 and 42 of the machine frame 3. Drive means, not shown, are included for moving the slides 38 of the corner shaping installations. These drive means can be, for example, rope pulleys or chain hoists or, alternatively, also drive pinions engaging into racks or spindle drive units.

Each slide 38 carries a plate 46 that can be reciprocated by means of a pressure medium motor 44 (arrow 45); two pressure medium motors 47 and 48 are mounted on this plate. Angles 49 and 50 are connected to the piston rods of the pressure medium motors; these angles can be moved toward and away from each other. In this procedure, the angle 50 contacts the spacer 22, to be formed in the corner zone to a sharp corner, from the outside, and the angle 49 establishes such contact from the inside.

Furthermore, a heatable squeeze clamp with jaws 51 that can be heated is provided at the beam 6 or at another suitable location of the device of this invention; these jaws can be placed into contact with two side faces of the spacer 22 with the aid of a pressure medium motor 52 via a gear system, not shown in detail, which is installed, for example, in the jaw support 53. By repeating operation of the pressure medium motor 52, the jaws 51 can again be swung away from the spacer 22. The purpose of these heating jaws 51 is to melt the spacer 22 in the butt zone in order to obtain an all-around sealed spacer 22.

The just-described device operates as follows:

A glass sheet to which a spacer 22 is to be mounted is conveyed into the device while standing on the conveyor rollers 2 and in contact with the supporting wall 1, by way of the air cushion, the final position as well as the dimensions of the glass sheet being detected via end stops or, respectively, height and width measuring means, which are not shown in detail. Once the glass sheet has reached the predetermined position, it is arrested and held against the supporting wall 1 by the application of a vacuum to the openings in this wall (air cushion wall).

Thereupon the sliding pressure pad 21 is placed, by moving the slide 5 and the beam 6, into a position wherein it is located in opposition to the lower horizontal rim of the glass sheet in a previously determined zone (reference point). At this point in time, the guide strips 29 and 30 of the sliding pressure pad 21 are aligned horizontally, i.e. in parallel to the lower rim of the glass sheet. By combined movements of the beam 6 and of the slide 5, the sliding pressure pad 21 is now moved along the periphery of the glass sheet around the latter; at each corner of the glass sheet, pivoting of the sliding pressure pad 21 by 90° is executed until the sliding pressure pad 21 has again reached the reference point. Now the spacer 22 is cut off, and the sliding pressure pad 21 is moved away into a waiting position by being lifted off the glass sheet and by operation of the beam 6 and/or of the slide 5. The relative motion between the supporting wall 1 and the sliding pressure pad 21 transversely to the plane of the supporting wall 1 can be brought about, for example, by a transverse adjustment of the supporting wall 1 with respect to the machine frame 3. It is possible in the same way to fashion the processing tool 4 at the slide 5, or also merely the sliding pressure pad 21, to be adjustable transversely to the plane of the supporting wall 1 by means of a drive motor.

To limit the extent to which the spacer 22 wraps about pad 21 as a result of changes in direction, it is possible to form two butt joints in spacer 22, one along the upper horizontal stretch of spacer 22 and the other along the lower horizontal stretch thereof. The spacer is thus applied in two U-shaped sections, the pad 21 being removed from the spacer and repositioned between application of the two sections.

After a spacer 22 has been attached along the periphery of a glass sheet, the corners, namely initially the corners at the rear as seen in the conveying direction, are shaped into sharp corners with the aid of the corner shaping means 34 and 37. Thereupon the glass sheet, after the vacuum has been removed, is transported further on the conveyor rollers 2 until the butt joint zone of the spacer 22 comes to lie in the region of the jaws 51 of the heating clamp. Then the jaws 51 are applied, by operating the pressure medium motor 52, against the side faces of the spacer 22, and the ends of the latter are joined by fusing. Since the butt joint zone of the spacer 22 is in the reference point, it is not difficult to locate the junction zone of the spacer 22 in the region of the heating jaws 51.

To avoid interference between jaws 51 and vertically extending portions of spacer 22, jaws 51 are further bodily movable transversely away from the plane of the glass.

Finally, the two corners of the spacer 22 which are at the front as seen in the conveying direction are shaped with the aid of the corner shaping means 35 and 36 and the glass sheet, thus equipped with a spacer 22, is transported further, for example to an assembly station for insulating glass.

In case a saw or a similar rotating tool is utilized, instead of the blade 25, for severing the spacer 22, it is recommended to feed to this cutting tool an emulsion preventing the saw from sticking to the spacer, which latter normally contains butyl rubber. It is advantageous, in this connection, to employ a vaporizing emulsion.

Since, as mentioned further above, the device of this invention includes means for determining the dimensions of the glass sheet to be equipped with a spacer 22, it is possible, based on the detected measured data, to determine the required length of a spacer 22. By furthermore associating, for example, a measuring unit with the feeding roller pair 20 at the processing tool 4, or with the guide rollers 31, 32 at the sliding pressure pad 21, which unit detects the length of the spacer 22 moved through in between the rollers, then the severing means 24, 25 can be activated after unreeling the corresponding length of spacer 22 from the storage reel 19, so that automatically the correct length of spacer 22 is mounted to the glass sheet.

Inasmuch as the height of the level of the lower corners of the glass sheet and thus of the lower corners of the spacer 22 is determined by the conveyor rollers 2 of the conveyor route, it is sufficient to make only the two upper corner shaping means 34 and 35 vertically adjustable.

What is claimed is:

1. A device for mounting elongated flexible spacers for insulating glass on a glass sheet, comprising a vertical beam, means mounting the beam for horizontal movement along a glass sheet to which an elongated flexible spacer is to be applied, a slide movable vertically on the beam, a storage reel for a rolled up length of said spacer, a feeding roller pair between which said spacer moves upon leaving the storage reel, a pressure pad for pressing said spacer against a glass sheet, means mounting the feeding roller pair and the pressure pad on the slide for vertical swinging movement about an axis perpendicular to the glass sheet, and severing means carried by the slide for cutting off an applied length of the spacer.

2. Device according to claim 1, the severing means comprising a blade, and a guide disposed on the opposite side of the path of the spacer from the blade and serving as an abutment against which the spacer is pressed by the blade during severing.

3. Device according to claim 1, said pressure pad having two guide strips thereon with said roller pair disposed at an entry end of said two guide strips for entry of the spacer between the two guide strips, said axis being at the outlet end of said guide strips.

4. Device according to claim 1, and means for shaping square corners of the spacer, there being a said shaping means in each of four corners of the glass sheet.

5. Device according to claim 4, said corner shaping means being mounted on slides that are adjustable upward and downward along guide rails.

6. Device according to claim 4, each said corner shaping means comprising two angles which, for forming the corners of the spacer, can be moved toward each other against opposite sides of the spacer.

7. Device according to claim 6, said angles being mounted on piston rods of pressure medium motors.

8. Device according to claim 7, said pressure medium motors being mounted on a supporting plate which in turn is mounted for reciprocatory movement by means of a further pressure medium transversely to the plane of the glass sheet.

* * * * *